United States Patent Office 3,034,992
Patented May 15, 1962

3,034,992
METHOD OF PREPARING CATALYST COMPOSITES
Erik Tornqvist, Westfield, N.J., and Charles William Seelbach, Baton Rouge, La., assignors to Esso Research and Engineering Company, a corporation of Delaware
No Drawing. Filed Mar. 19, 1958, Ser. No. 722,372
6 Claims. (Cl. 252—429)

This invention relates to an improved method of preparing catalysts used in the low pressure polymerization of alpha olefins. More particularly it relates to a process for preparing the so-called "preformed" catalyst systems and obtaining complete catalyst composites.

The low pressure polymerization and copolymerization of alpha olefins with catalyst systems made up of reducible, heavy, transition metal compounds and a reducing metal containing compound to high density, isotactic, high molecular weight, solid, relatively linear products has been assuming ever increasing importance and is now well known, see e.g. Belgium Patent 533,362, "Chemical and Engineering News," April 8, 1957, pages 12 through 16, and "Petroleum Refiner," December 1956, pages 191 through 196.

The alpha olefinic feeds utilized in polymerization and copolymerization include ethylene, propylene, butene-1, heptene-1, dodecene-1, etc. and mixtures thereof with ethylene and propylene preferred.

The conditions conveniently utilized are temperatures in the range of about 0° to 150° C. with intermediate temperatures preferred; pressures employed have varied from subatmospheric to 250 atmospheres with more moderate pressures preferred.

In some cases, particularly the polymerization of propylene, it has been found desirable to utilize "preformed" catalysts, i.e., those in which a heavy transition metal halide is subjected to a preliminary reduction to a lower valence state prior to admixture with the activating reducing metal-containing compound. This can give more stable, crystalline catalyst systems which are capable of producing higher yields of polymers as well as polymers of higher crystallinity. For example, $TiCl_4$ has been reduced to $TiCl_3$, $TiCl_2$ or even lower in the preparation of preformed catalyst systems.

One of the preferred manners of reducing the heavy transition metal halide is by treatment with a finely divided powder of a group IIB or group IIIB metal of the periodic table, aluminum in particular, or a mixture of a powder of such a metal with a powder of the transition metal itself at 200° to 500° C. and at pressures of 50 to 500 p.s.i.g. and in an oxygen free inert atmosphere as described in copending patent application Serial No. 578,198. In the reduction of the heavy transition metal halide by the indicated metals, the group II or group III metal halide is formed as indicated in Equations I and II.

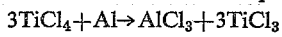

(Equation I)

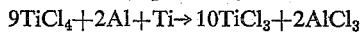

(Equation II)

These materials then require further activation with alkyl metal compounds, usually in solution, e.g. $Al(Et)_3$ in heptane.

Problems arise, however, in the required activation procedure. An equilibrium exists between the aluminum alkyl concentration in the diluent and the amount of aluminum alkyl adsorbed on the $TiCl_n$ surface. In some cases, this equilibrium is reached quite slowly especially when very dilute aluminum alkyl solutions are being used. Extensive studies, especially at atmospheric pressure, have shown that fouling very easily occurs if the $TiCl_n$ is added to a polymerization medium before having been properly contacted with the metal alkyl. The slow activation of the $TiCl_n$ by the metal alkyl results in a slow polymerization and agglomeration of the catalyst particles. In contrast to this, properly activated catalyst particles will not stick together but give an excellent polymer-catalyst slurry.

The activation of $TiCl_n$ by contacting it with a very dilute metal alkyl solution is unsuitable for still another reason. The $TiCl_n$ is itself quite readily susceptible to poisoning and may adsorb certain poisons on its surface in preference to the metal alkyl. This is, of course, particularly critical if and when the $TiCl_n$ is slurried in an inert metal alkyl free diluent prior to being contacted with the dilute metal alkyl solution.

This invention provides an improved method of overcoming these difficulties. The method comprises intimately contacting the reduced, heavy, transition metal halide admixed with the metal halide with a concentrated solution, in an inert volatile hydrocarbon, of an alkyl metal compound of the nature specified below. After a sufficient period of time of contacting the inert volatile hydrocarbon is distilled off preferably at reduced pressures and a temperature in the range of 0 to 100° C. A granular complete catalyst composite is thereby obtained. This product is ready for dispersion in an inert organic diluent and is then ready for polymerization without additional alkyl metal compound.

The reduced heavy transition metal halides here referred to are the halides of the transition metals of the IV-VIB and VIII groups of the periodic table, e.g. titanium, zirconium, hafnium, thorium, uranium, vanadium, niobium, tantalum, chromium, molybdenum and tungsten, as well as iron. The chlorides and bromides are generally preferred, titanium, zirconium and vanadium being the most active of these metals. The following heavy metal compounds are readily reducible to lower halides, titanium tetrachloride, titanium tetrabromide, titanium tetraiodide, zirconium tetrachloride, zirconium tetrabromide, vanadium tetrachloride and vanadium oxychloride ($VOCl_3$).

The activating compounds that can be utilized are characterized by the formula

wherein Me is a metal selected from the class consisting of metals of groups II and III of the periodic table, X is a halogen, R is an alkyl group, $m$ is an integer from 1 to 3, $n$ is an integer from 1 to 2, the total of $m+n$ being an integer from 2 to 3. The R groups can be the same or different and preferably contain from 2 to 8 carbon atoms. Among the most valuable reducing metal-containing compounds are alkyl aluminum compounds, especially trialkyl aluminum compounds such as triethyl aluminum, tripropyl aluminum, triisobutyl aluminum, etc. and dialkyl aluminum compounds such as diethyl aluminum halides, diethyl aluminum chloride in particular, dipropyl halides, diisobutyl halides, etc. Monoalkyl aluminum compounds can also be used. These activating compounds are utilized in solutions in the inert hydrocarbons in concentrations from about 0.5 to 5 moles.

The inert volatile hydrocarbons that can be used include paraffinic hydrocarbons such as isopentane, heptane, decane or other saturated petroleum or synthetic hydrocarbon oils, e.g. white mineral oil, naphthenes such as methyl cyclohexane or decalin. Aromatics such as benzene, xylene, etc. are also suitable diluents. The diluents should boil at below about 200° C. at atmospheric pressure.

Systems of aluminum trialkyls and titanium halides are particularly preferred and useful, e.g. aluminum triethyl and reduced titanium tetrachloride. In general, mole ratios of 0.5/1 or higher of aluminum trialkyl to reduced titanium tetrachloride are employed.

The ratio Al-alkyl/TiCl$_n$ can, of course, be varied within wide limits, but the optimum ratio will depend upon the particular catalyst requirements of each monomer to be polymerized. In the case of propylene polymerization, AlEt$_3$ has so far proved to be a better activator than AlEt$_2$Cl although the latter might be quite effective at elevated pressures. AlEtCl$_2$, however, is practically useless in this case. It is well known that AlCl$_3$ present in the catalyst will react quite readily with AlEt$_3$ and AlEt$_2$Cl to form those lower aluminum alkyl chlorides which correspond to the molar ratios of the starting materials. Therefore, when AlEt$_2$Cl or a higher Al-alkyl is needed as the activator as in propylene polymerizations and an AlCl$_3$ containing TiCl$_n$ preparation is used, AlEt$_3$ or another Al-trialkyl must be used either alone or in combination with a lower Al-alkyl such as AlEt$_2$Cl as the activator. The minimum amount of AlEt$_3$ needed would then be determined by the AlCl$_3$ content of the TiCl$_n$ catalyst as demonstrated in the following equation:

$$TiCl_n - xAlCl_3 + 2xAlEt_3 \rightarrow TiCl_n - 3xAlEt_2Cl$$

(Equation III)

Obviously, all of the AlCl$_3$ present may not be available for reaction during the catalyst preparation but the catalyst may disperse further during the polymerization in which case some free AlEt$_3$ is needed for reaction with the unreacted AlCl$_3$. More AlEt$_3$ must, of course, be added if the Al-trialkyl is needed for the catalyst activation. In the same way as described above, AlEt$_3$ or AlEt$_2$Cl can be added to a TiCl$_n$—xAlCl$_3$ catalyst in such proportions that AlEtCl$_2$ is the only aluminum alkyl present after the reaction.

The intimate contacting of the TiCl$_n$—xAlCl$_3$ with the alkyl metal solution can be done in several different ways. In general, one should try to make the contacting as vigorous as possible by applying proper stirring and mixing. The treatment is, for instance, very advantageously carried out in a ball mill jar. In this case, good contacting is achieved at the same time as a fresh catalyst surface is being prepared by the milling action. The treatment may vary from a few hours to several days depending upon the intensity of treatment. Thus much shorter milling times can be used when chrome alloy steel balls are used than when flint pebbles are used. One must, of course, control the severity of treatment so that no undesirable change takes place in the crystal structure of the reduced transition metal halide. In general the intensity of treatment will depend both upon the concentration of the alkyl metal and on the severity of the mechanical treatment.

The polymerization reaction itself is preferably carried out while stirring in batch or continuous operation in added organic diluent liquid of the same nature as indicated. When operating batchwise, olefin introduction is continued until the catalyst is wholly or partially exhausted and the reaction slows down. Sufficient pressure may be applied during the reaction to maintain the lower boiling diluents in a liquid state. The final polymer concentration in the reaction mixture may be about 10 to 40 wt. percent. It may be advantageous in some cases to add a small amount of additional Al-alkyl with the diluent in order to prevent poisoning of the already formed highly active complete catalyst. The amount of separately added Al-alkyl needed will, of course, depend upon the poison level in the system, but may be in the range of 0.1–1 mole per mole TiCl$_n$ or substantially less than is needed in order to activate an uncomplexed TiCl$_n$ catalyst under the same conditions. No additional Al-alkyl is needed in a poison free system or in a system of a very low poison level.

Upon completion of the polymerization reaction the catalyst can be completely deactivated, e.g. by the addition of an alcohol such as methyl, isopropyl or n-butyl alcohol, in amounts of about 10 to 100 times the amount of catalyst used. The reaction slurry can then be filtered, the filter cake re-slurried in a catalyst solvent such as dry, concentrated alcohol at about 50° to 100° C. for 15 to 60 minutes, filtered again and the filter cake dried, preferably under reduced pressure. If desired a suitable oxidation inhibitor may also be added. Ash residues in the polymer are reduced below about 0.05% by this procedure. If necessary, the ash content may be further reduced by aqueous acid treatment, etc., according to methods well known in the art, or by using chelating agents, such as acetylacetone. The organic diluents can be recovered for use in catalyst preparation, polymerization, etc.

The polymers produced have molecular weights in the range of about 100,000 to 300,000 or even as high as 3,000,000 as determined by the intrinsic viscosity method using the I. Harris Correlation (J. Polymer Science, 8, 361 (1952)). They have a high degree of crystallinity and a low solubility in n-heptane.

This invention and its advantages will be better understood by reference to the following examples.

EXAMPLE 1

50 g. of a TiCl$_{2.8}$—0.23AlCl$_3$ preparation was ball milled overnight with the amount of AlEt$_3$ (14.8 g. in 35 ml. n-pentane) needed to convert the AlCl$_3$ into AlEt$_2$Cl according to the following equation:

$$(TiCl_{2.8} + 0.23AlCl_3) + 0.46AlEt_3 \rightarrow TiCl_{2.8} + 0.69AlEt_2Cl$$

The n-heptane used for dilution of the AlEt$_3$ was distilled off by heating the preparation to 90° C. under vacuum (about 2 mm. Hg). A dark purple granular powder containing a calculated amount of 360 mg. AlEt$_2$Cl per g. was obtained.

EXAMPLES 2–4

The complete catalyst prepared according to Example 1 was tested in bomb polymerizations of propylene. 300 ml. Aminco steel bombs were used with a propylene charge of 100 g. The polymerization was carried out at 80° C. for 7 to 16 hours. The actual polymerization time was, however, much shorter as evidenced by the time-pressure relationship in the bombs. Data from three polymerizations (Examples 2–4) are given in Table I. The highest efficiency (Example 2) 178 g./g. compares very favorably with those obtained with other low Al/Ti molar ratio catalysts (see Examples 5–8). On the usual AlR$_3$/TiCl$_n$ basis this catalyst actually corresponds to a 0.46/1 Al/Ti catalyst.

*Table I*

POLYMERIZATION OF PROPYLENE WITH COMPLETE TiCl$_{2.8}$—0.69AlEt$_2$Cl CATALYST [a]

[300 ml. rocking bomb]

| Example | 2 | 3 | 4 |
|---|---|---|---|
| Feed and Diluent Components: | | | |
| Propylene, g | 110 | 90 | 95 |
| n-Heptane, ml | 30 | 30 | 30 |
| Catalyst: Weight, g | 1.0 | 0.5 | 0.25 |
| Reaction Conditions: | | | |
| Catalyst Concn., g./l | 4.3 | 2.1 | 1.1 |
| Ave. Temperature, ° C | 80 | 80 | 80 |
| Run Length, hrs.[b] | 7 | 7 | 7 |
| Results: | | | |
| Total Polymer, g | 106.5 | 69.0 | 44.4 |
| Waxy Polymer, percent | 2.8 | 3.2 | 5.2 |
| Catalyst Efficiency, g./g.— | | | |
| On total catalyst | 106.5 | 138 | 178 |
| On TiCl$_{2.8}$ | 167 | 216 | 278 |
| Properties of Solid Polymer: | | | |
| Mol. Wt. × 10$^{-3}$ | 110 | 190 | 160 |
| Heptane Insoluble, percent | 52.4 | 54.4 | 56.1 |
| Soft. Pt./Melt. Pt., ° C | 150/160 | 145/158 | |
| Tensile Strength, p.s.i | 2,100 | 2,010 | |
| Elongation, percent | 750 | 130 | |

[a] TiCl$_{2.8}$—0.23AlCl$_3$ preparation ball milled with the stoichiometric amount of AlEt$_3$ to form complete catalyst TiCl$_{2.8}$—0.69 AlEt$_2$Cl. Al/Ti ratio calculated on usual amount of AlEt$_3$/TiCl$_n$ basis=0.46.

[b] The actual polymerization time was usually much shorter than the time used.

EXAMPLES 5-8

A number of catalysts were prepared by adding $AlEt_3$ or $AlEt_2Cl$ to n-heptane slurries of $TiCl_{2.8}$—$0.23AlCl_3$ and $TiCl_3$. The composition of the catalysts thus obtained resembled very closely the composition of the complete catalyst prepared according to this invention. They were tested in bomb polymerization of propylene in 300 ml. Aminco bombs under the same conditions as described in Examples 2-4. Data from four polymerizations are given in Table II.

As can readily be seen, the catalysts prepared by just mixing the two catalyst components did not in any case give as high catalyst efficiencies as the catalyst prepared according to this invention. This indicates that the claimed method of treatment results in the formation of more catalytically active sites than a mere mixing of the two catalyst components.

Table II

POLYMERIZATION OF PROPYLENE WITH ALUMINUM ALKYL ACTIVATED $TiCl_n$—$xAlCl_3$ CATALYSTS AT LOW Al/Ti MOLAR RATIOS

[300 ml. rocking bomb]

| Example | 5 | 6 | 7 | 8 |
|---|---|---|---|---|
| Feed and Diluent Components: | | | | |
| Propylene, g | 90 | 90 | 100 | 95 |
| n-Heptane, ml | 30 | 30 | 30 | 30 |
| Catalyst: | | | | |
| Titanium Halide— | | | | |
| Type | $TiCl_{2.8}$—$0.23AlCl_3$ | | $TiCl_3$ | $TiCl_3$ |
| Weight, g | 0.77 | 0.384 | 0.64 | 0.46 |
| Aluminum Alkyl— | | | | |
| Type | $AlEt_3$ | | $AlEt_2Cl$ | $AlEt_3$ |
| Weight, g | 0.23 | 0.116 | 0.36 | 0.18 |
| Al/Ti Ratio | 0.69 | 0.69 | 0.69 | 0.5 |
| Reaction Conditions: | | | | |
| Catalyst Concn., g./l | 4.8 | 2.4 | 4.3 | 2.9 |
| Ave. Temperature, °C | 80 | 80 | 80 | 80 |
| Run Length, hrs.[a] | 7 | 7 | 7 | 7 |
| Results: | | | | |
| Total Polymer, g | 78 | 41 | 48 | 68 |
| WaxyPolymer, percent | 5.9 | 8.6 | 8.9 | 7.1 |
| Catalyst Efficiency, g./g.— | | | | |
| On Total Catalyst | 78 | 82 | 48 | 106 |
| On $TiCl_n$ | 101 | 107 | 75 | 154 |
| Properties of Solid Polymer: | | | | |
| Mol. Wt. $\times 10^{-3}$ | 140 | 170 | 180 | 88 |
| Heptane Insolubles, percent | 51.6 | 48.4 | 59.6 | 58.4 |
| Soft. Pt./Melt. Pt., °C | 149/160 | 144/158 | 150/159 | 151/159 |
| Tensile Strength, p.s.i | 1,940 | 1,720 | 2,060 | |
| Elongation, percent | 620 | 430 | 180 | |

[a] The actual polymerization time was usually much shorter than the time used.

The advantages of this invention will be apparent to the skilled in the art. Higher yields of polymer are obtained than with catalysts of the same composition but not treated according to this method. Separate handling of alkyl metal solutions at the site of processing is eliminated. This is important since these solutions present fire hazards. The granular solid composite is not pyrophoric and will only be oxidized on its surface when contacted with air.

It is to be understood that this invention is not limited to the specific examples which have been offered merely as illustrations and that modifications may be made without departing from the spirit of the invention.

What is claimed is:

1. A method of preparing a polymerization catalyst composite which comprises intimately contacting a reduced heavy transition metal halide of group IVB of the periodic table, admixed with a halide of a metal selected from the class consisting of metals of the group IIIB of the periodic table with an 0.5-5 molar solution, in an inert volatile hydrocarbon, of an activating alkyl aluminum compound, and distilling off the volatile hydrocarbon.

2. The method of claim 1 in which the distillation is carried out at a temperature of 0° to 100° C.

3. The method of claim 1 in which the inert hydrocarbon boils at below 200° C. at atmospheric pressure.

4. The method of claim 1 in which the transition metal halide is a titanium halide.

5. The method of claim 2 in which the distillation is carried out at subatmospheric pressure.

6. The method of claim 4 in which the titanium halide is titanium chloride, the metal halide with which it is admixed is aluminum chloride and the activating compound is aluminum triethyl.

References Cited in the file of this patent

UNITED STATES PATENTS

| 2,721,189 | Anderson | Oct. 18, 1955 |
| 2,900,374 | Aries | Aug. 18, 1959 |